United States Patent [19]
Buchheim

[11] Patent Number: 6,061,306
[45] Date of Patent: May 9, 2000

[54] PORTABLE DIGITAL PLAYER COMPATIBLE WITH A CASSETTE PLAYER

[75] Inventor: James Buchheim, 71 Zabotinsky Rd., Hod Hasharon, Israel

[73] Assignees: James Buchheim, Hod Hasharon, Israel; Dean Chang, Taipei, Taiwan

[21] Appl. No.: 09/357,800

[22] Filed: Jul. 20, 1999

[51] Int. Cl.⁷ .................................................. H04B 1/20
[52] U.S. Cl. .................................................. 369/2; 369/11
[58] Field of Search ............................. 369/2, 1, 6, 9–10, 369/7–8, 11–12, 289, 292, 4; 360/104, 109, 137

[56] References Cited

U.S. PATENT DOCUMENTS 5,307,326  4/1994  Osawa ........................................ 369/2
5,586,090  12/1996  Otte ............................................ 369/2

*Primary Examiner*—Ali Neyzari
*Attorney, Agent, or Firm*—Mark M. Friedman

[57] ABSTRACT

A portable audio device is provided and includes (a) a housing shaped as a cassette and insertable into a cassette deck of a cassette player; (b) a digital audio player in the housing, the digital audio player including a memory and an audio chip for storing and subsequently playing digital audio information through at least one speaker; and (c) an emulator in the housing, the emulator operatively communicating with the digital audio player for emulating the digital audio information as analog audio information readable by a magnetic playing head of the cassette player for playing the digital audio information through the cassette player.

30 Claims, 2 Drawing Sheets

PORTABLE DIGITAL PLAYER COMPATIBLE WITH A CASSETTE PLAYER

FIELD AND BACKGROUND OF THE INVENTION

The present invention relates to an audio player and, more particularly, to a portable digital audio device which is also structurally and functionally compatible with a cassette player and may therefore also be used as a digital cassette playable by a conventional, i.e., analog, cassette player.

Audio players has tremendously evolved since the introduction of the radio which is an apparatus for receiving or transmitting radio broadcasts telecommunicated employing electromagnetic waves of a particular frequency range to transmit speech or other sound over long distances without the use of wires, and the gramophone, which is the first records player.

Two main recording technologies apply for audio players. The first is analog recording which is a method of sound recording in which an input audio waveform is converted to an analog waveform. The second is digital recording which is a method of recording sound in which an input audio waveform is sampled many thousands of times per second and each sample is given a binary numerical value.

Portable audio players were realized as soon as sufficient miniaturization was technologically feasible.

The first portable audio player was a miniaturized radio device, also known as a radiotransistor or simply as a transistor, which includes a compact solid-state device (radiotransistor) including a semiconductor with three or more electrodes and which performs the primary functions of an electron tube, as amplification, switching, and detection, but uses less power.

Another well known portable audio player is the walkman which is a small portable stereo player used with, or shaped as, headphones, which typically functions both as a radio, and/or as a cassette player. A cassette is a plastic case in which analog audio magnetic tape runs between two reels for use in recording of sound or playing back.

Quickly following the introduction of compact disks (CDs), which include digital audio information, and CD players which are devices designed for playing the audio information stored in CDs, the CD players were miniaturized to become portable. Such portable CD players are known as diskman.

The digital CD technology is superior to analog audio tape in terms of durability and quality, however it is not widely amenable for personal recording of audio information.

The most recent development in portable audio players is the chip based digital player which enjoys both the quality and durability of CDs and which is readily amenable for personal recordings. A digital audio player includes an audio chip and a memory which serve to record, store, and subsequently play digital audio information. Typically, an audio chip is also designed to compress and decompress audio digital data in order to save memory space. Digital audio players became feasible with the co-evolution of miniaturized high capacity digital memory devices and digital information compression technologies.

Thus, MP3, MP4, AT&T, a2b, Liquid Audio, Real Audio and SDMI audio players, which are digital audio players, are becoming widely used. These players enable the download, store and subsequent play compatibly compressed digital audio information from, for example, the Internet.

Many automobiles and homes are equipped with stereo systems. Typically, such stereo systems include a radio, a cassette player and a CD player. Being stationary, such stereo systems are not designed nor are they convenient for download and subsequent play of digital information.

Emulators have therefore been developed to enable a user to play audio digital downloads in such stereo systems.

Such an emulator is shaped as a cassette insertable into a cassette deck of a cassette player. It includes a line connectable to the line-out connector (which typically serves to accept an earphone) of any audio device, including, for example, portable digital players or CD players.

Through the line, the emulator receives audio information input from the audio device and produces audio information output in the form of emulated magnetic information which is recognized by the magnetic playing head of the cassette player and is converted thereby into sound.

This design, however, is limiting. For example, when used with automobile cassette players which have a frontal, uncovered, cassette deck, the portable audio device is not rigidly anchored and may therefore be damaged. Home and other stereo systems typically include a covered cassette deck which is not at all applicable for use with an emulator because the line connecting the emulator to the audio device prevents appropriate closure of the cover. Furthermore, operational commands to the audio device cannot be executed via the control panel of the cassette player.

There is thus a widely recognized need for, and it would be highly advantageous to have, an audio device devoid of the above limitations. Such a device serves both as a portable digital audio device, and yet it is also structurally and functionally compatible with a cassette player and may therefore also be used as a digital cassette playable and controlled by a conventional, i.e., analog, cassette player.

SUMMARY OF THE INVENTION

According to the present invention there is provided a portable audio device comprising (a) a housing shaped as a cassette and insertable into a cassette deck of a cassette player; (b) a digital audio player in the housing, the digital audio player including a memory and an audio chip for storing and subsequently playing digital audio information through at least one speaker; and (c) an emulator in the housing, the emulator operatively communicating with the digital audio player for emulating the digital audio information as analog audio information readable by a magnetic playing head of the cassette player for playing the digital audio information through the cassette player.

According to further features in preferred embodiments of the invention described below, the at least one speaker is integrally built in the housing.

According to still further features in the described preferred embodiments the at least one speaker is externally connectable to the portable audio device through a speaker connector formed in the housing and which is operatively communicating with the digital audio player.

According to still further features in the described preferred embodiments the at least one speaker is formed and operated as at least one earset.

According to still further features in the described preferred embodiments the at least one speaker includes two speakers.

According to still further features in the described preferred embodiments the two speakers are externally connectable to the portable audio device through a speaker connector formed in the housing and which is operatively communicating with the digital audio player.

According to still further features in the described preferred embodiments the two speakers are formed and operated as earsets.

According to still further features in the described preferred embodiments the portable audio device further comprising a recording chip in the housing, the recording chip being for recording in a digital form sound into the memory.

According to still further features in the described preferred embodiments the audio chip and the recording chip are integrated into a single audio-recording chip.

According to still further features in the described preferred embodiments the portable audio device further comprising a microphone in the housing, the microphone operatively communicating with the recording chip.

According to still further features in the described preferred embodiments the portable audio device further comprising an external microphone connector formed in the housing so as to enable an external microphone to operatively communicate with the recording chip.

According to still further features in the described preferred embodiments the portable audio device further comprising external operation buttons engaged by the housing for executing operator commands.

According to still further features in the described preferred embodiments the operator commands are selected from the group consisting of play, stop, pause, backward, forward, repeat, repeat a sequence, record, volume control, bass control, treble control, speakers balance and fade effects control.

According to still further features in the described preferred embodiments the portable audio device further comprising a communicator for communicating with a computer, the communicator being for downloading digital audio information from the computer for storing in the memory.

According to still further features in the described preferred embodiments the communicator is selected from the group consisting of cord communicator and cordless communicator.

According to still further features in the described preferred embodiments the cordless communicator is selected from the group consisting of infrared communicator, radio communicator and microwave communicator.

According to still further features in the described preferred embodiments the portable audio device further comprising (d) at least one sensor for sensing at least some operational commands of the cassette player when the portable audio device engages the cassette deck of the cassette player; and (e) at least one mechanism for translating the operational commands of the cassette player into respective executed operations of the portable audio device.

According to still further features in the described preferred embodiments the at least one sensor includes at least one reel for sensing an operational command selected from the group consisting of play, pause, backward and forward.

According to still further features in the described preferred embodiments the at least one sensor includes a sensing mechanism for sensing an operation of a magnetic recording head of the cassette player.

According to still further features in the described preferred embodiments the portable audio device further comprising a power source engageable in the housing.

According to still further features in the described preferred embodiments the power source is a battery.

According to still further features in the described preferred embodiments the power source is a rechargeable battery, the housing is formed with a charging connector for recharging the rechargeable battery.

According to still further features in the described preferred embodiments the portable audio device further comprising a visual display for displaying visual information.

According to still further features in the described preferred embodiments the visual information is selected from the group consisting of information pertaining to a played audio information, power availability and memory availability.

According to still further features in the described preferred embodiments the visual display is selected from the group consisting of a light emitting diode display and a liquid crystal display.

According to still further features in the described preferred embodiments the portable audio device further comprising a slot for operatively accepting a memory expansion device.

According to still further features in the described preferred embodiments the emulator operatively communicating with a magnetic recording head of the cassette player for recording in a digital form audio information through the magnetic recording head.

According to still further features in the described preferred embodiments the portable audio device further comprising a radiotransistor for receiving and playing radio broadcast.

The present invention successfully addresses the shortcomings of the presently known configurations by providing a portable digital audio device which also serves as a digital cassette operable with a conventional, i.e., analog, cassette player.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
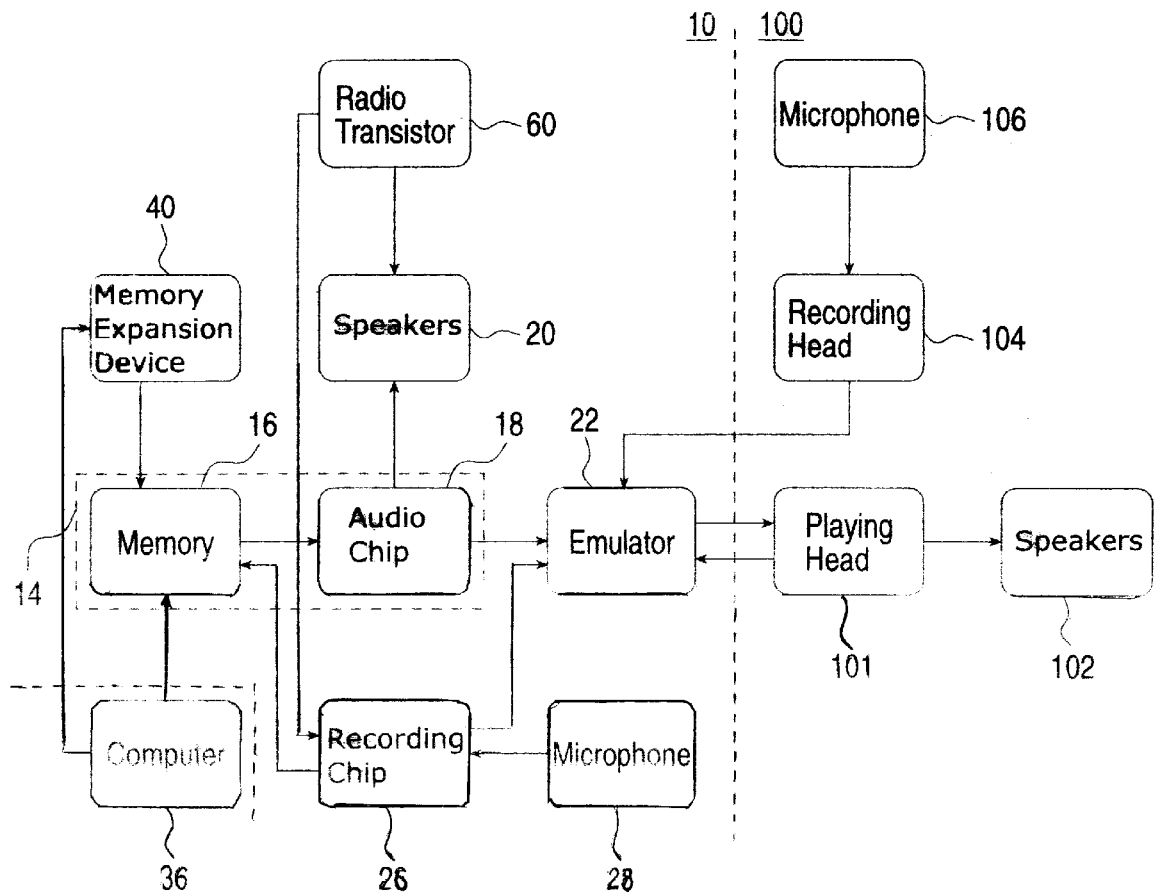
FIG. 1 is a black box diagram of the portable audio device according to the present invention and of a cassette player.

The present invention is of a portable audio device which is structurally and functionally compatible with a cassette player, which can be operated and used as a stand-alone audio device or as a digital cassette operable with a conventional, i.e., analog, cassette player.

The principles and operation of a portable audio device according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 schematically illustrates, on the left hand side, some basic and some optional components of the portable audio device according to the present invention which is referred to hereinbelow as device 10 and, on the right hand side, some basic and some optional components of a cassette player with which device 10 optionally operatively communicates, which cassette player is referred to hereinbelow as player 100. FIGS. 2–6 illustrate top, rear, front and left and right side views, respectively, of device 10 according to preferred embodiments of the present invention.

Portable audio device 10 according to the present invention includes a housing 12. As best seen in FIGS. 2–6, housing 12 of device 10 is shaped as a conventional cassette and is therefore insertable into a cassette deck of cassette player 100.

As used herein in the specification and claims section that follows the phrase "cassette player" includes stereo devices having a cassette deck for accepting a cassette including a rollable magnetic audio tape and playing the audio information contained therein. A cassette player usable with the present invention can form a part of a walkman, a house stereo system, a car stereo system, a portable stereo system and the like.

As used herein in the specification and claims section that follows the phrase "cassette deck" refers to a cassette accepting slot of a cassette player. Such a slot is configured so as to bring in operational proximity, upon command, the tape and a magnetic playing head or a magnetic recording head of the cassette player. Such a slot is also configured so as to enable to run the magnetic tape in the cassette while engaging the slot upon command.

Device 10 further includes a digital audio player 14. Digital audio player 14 is housed in housing 12 and includes, in a minimal configuration, as indicated by the broken frame, a memory 16 and an audio chip 18 which together serve for storing and subsequently playing digital audio information through at least one, preferably two or more, speakers 20. Chip 18 is preferably adapted at encoding and decoding audio data compressed formats, such as, but not limited to, MP3, MP4, AT&T, a2b, Liquid Audio, Real Audio, SDMI and/or any other existing or developable audio data compressed format.

Memory 16 and audio chip 18 can be integrated into a single audio-memory chip as well known in the art. Memory 16 can be of any type, such as, but not limited to, RAM, ROM or Flash memory.

Thus, in one mode of operation device 10 can serve as a stand-alone device capable of playing audio information which is stored in a digital form.

Device 10 according to the present invention further includes an emulator 22. Emulator 22 is housed in housing 22. Emulator 22 operatively communicates with digital audio player 14 for emulating digital audio information as analog audio information which is therefore readable by a magnetic playing head 101 of cassette player 100, for playing digital audio information stored in memory 16 through speakers 102 of cassette player 100.

Thus, in addition to being a stand-alone device, device 10 is also designed to play audio information stored in a digital form through an analog cassette player, while being engaged in the cassette deck thereof.

Figure 2:
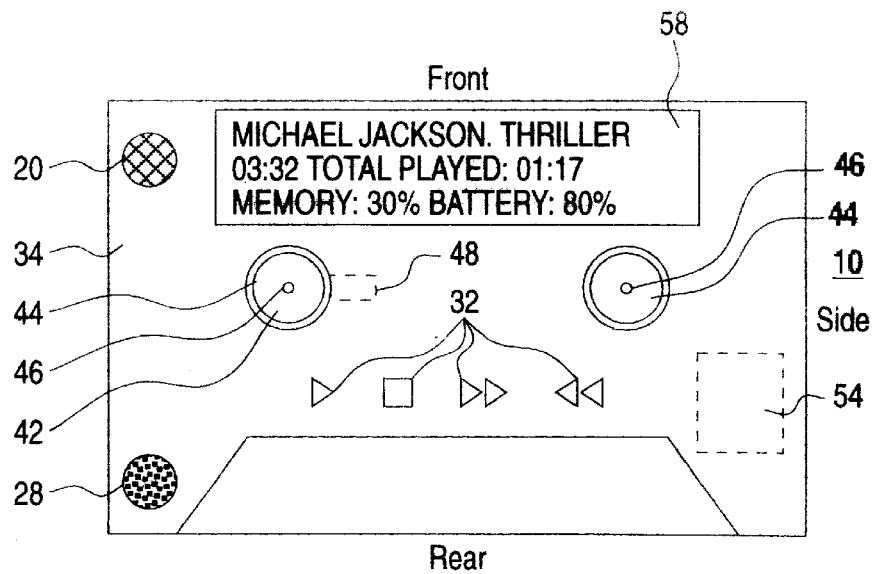
FIG. 2 is a top view of the portable audio device according to the present invention.
Figure 3:
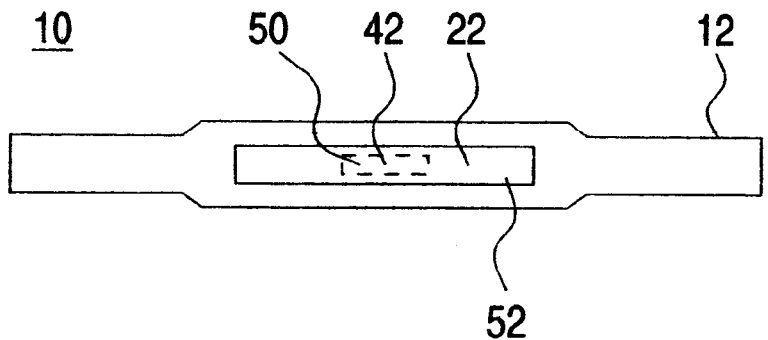
FIG. 3 is a rear view of the portable audio device according to the present invention.

According to one embodiment of the present invention, and as specifically shown in FIG. 2, speaker(s) 20 are integrally built-in in housing 12. However, according to a presently preferred embodiment of the present invention, and as specifically shown in FIG. 5, speaker(s) 20 are externally connectable to portable audio device 10 through a speaker connector (line-out) 24 formed in housing 12 and which is operatively communicating with digital audio player 14. According to a presently most preferred embodiment of the present invention speaker(s) 20 are formed and operated as earset(s).

As used herein in the specification and in the claims section that follows, the term "earset" or "ear sets" includes personal speaker(s) engageable in proximity to, or insertable into, the ear(s) of a listener, so as to enable the listener to hear sounds generated thereby, while substantially preventing that sound from being heard by nearby individuals.

According to a preferred embodiment of the present invention portable audio device 10 further includes a recording chip 26 housed in housing 12. Recording chip 26 serves for recording, in a digital form, sound into memory 16. Like chip 18, chip 26 is preferably adapted at encoding and decoding audio data compressed formats, such as, but not limited to, MP3, MP4, AT&T, a2b, Liquid Audio, Real Audio, SDMI and/or any other existing or developable audio data compressed format. It will be appreciated that audio chip 18 and recording chip 26 are integratable into a single audio-recording chip which optionally also includes memory 16 integrated thereto.

In order to effect sound recording, portable audio device 10 of the present invention further includes a microphone 28 which operatively communicates with recording chip 26. According to one embodiment, as shown in FIG. 2, microphone 28 is integrated within housing 12 of device 10. However, according to another embodiment of the present invention, and as specifically shown in FIG. 5, microphone 28 is an external microphone connectable to device 10 via a connector 30 (line-in) formed in housing 12 and which enables the external microphone to operatively communicate with recording chip 26.

Figure 4:
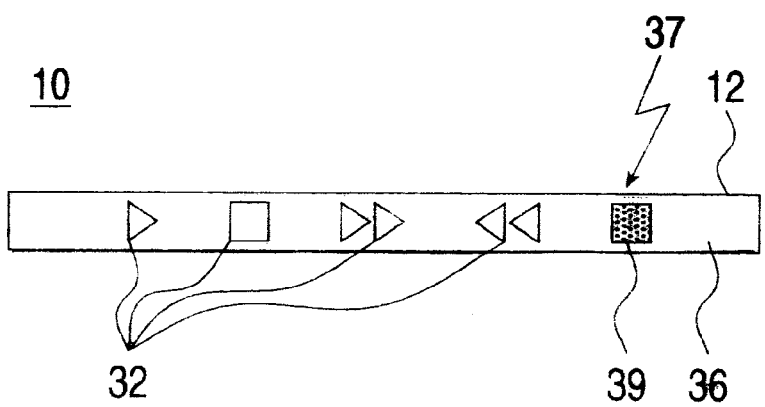
FIG. 4 is a front view of the portable audio device according to the present invention.
Figure 5:
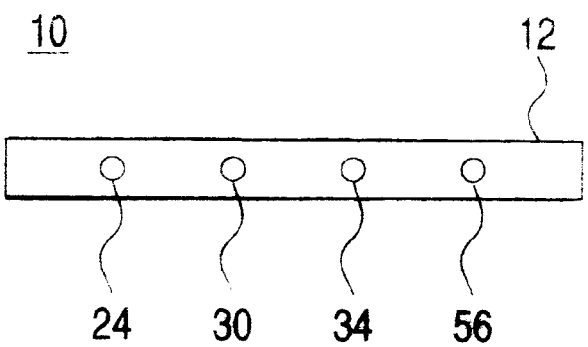
FIG. 5 is a side view of the portable audio device according to the present invention.

According to a preferred embodiment of the present invention portable audio device 10 includes external operation buttons 32. Buttons 32 are operatively engaged by housing 12 and serve for executing operator commands, such as, but not limited to, play, stop, pause, backward, forward, repeat, repeat a sequence, record, volume control, bass control, treble control, speakers balance and/or fade effects control, etc. As specifically shown in FIG. 2, buttons 32 can be arranged on a front face 34 of housing 12 or, as shown in FIG. 4, on a rear face 36 thereof. In the latter case buttons 32 are accessible to a user even when device 10 engages the cassette deck of player 100.

Alternatively or additionally a remote control transmitter, as indicated by arrow 37, and a remote control receiver 39 are employed to execute the above described operator commands. Any remote communication mode can be employed to remote control device 10, especially when engage in the cassette deck of player 100, such as, but not limited to, infrared, radio, microwave, sound frequency and the like, all as well known in the art of remote controls.

According to another preferred embodiment portable audio device 10 of the present invention further includes a communicator 34 for communicating with a computer 36.

As used herein in the specification and in the claims section that follows the phrase "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, Nokia Communicator™ or any other handheld device; or any other known and available operating system. The term further includes mobile cellular telephone devices and mobile cellular communicator devices having, in addition to telephone properties, capabilities similar to those of a personal computer (PC) or a personal digital assistant (PDA).

Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., U.S.A.).

Communicator 34 serves for downloading digital audio information from computer 36 for storing in memory 16. Communicator 34 can be of any type including cord and cordless communicators, such as, but not limited to, infrared communicator, radio communicator or microwave communicator.

Figure 6:
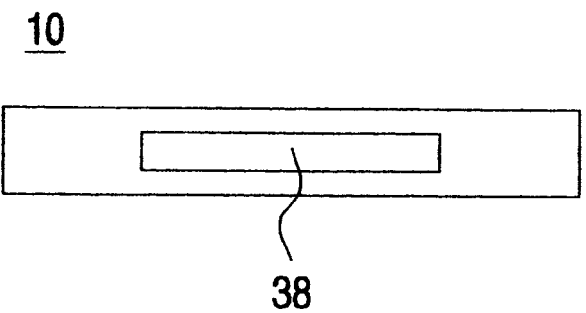
FIG. 6 is an opposite side view of the portable audio device according to the present invention.

As best seen in FIG. 6, device 10 according to the present invention preferably further includes a slot 38 for operatively accepting a memory expansion device 40. Device 40 is typically a flash memory expansion such as, but not limited to, compact flash, smart media or memory stick. Device 40 can also, according to preferred embodiments of the present invention, directly communicate with computer 36.

According to a preferred embodiment of the present invention portable audio device 10 includes at least one sensor 42 for sensing at least some or all operational commands of cassette player 100 when portable audio device 10 engages the cassette deck of cassette player 100. Device 10 preferably further includes at least one mechanism for translating operational commands of cassette player into respective executed operations of portable audio device 10.

For sensing commands such as play, forward, backward and pause, sensor 42 is preferably realized as at least one reel 44 which is rotatable about an axis 46. Rotation of reel(s) 42 is effected by cassette player 100 in a fashion identical to that employed for rotating the reels of a conventional magnetic tape cassette. The rotation of reel 42 is sensed by, for example, a light sensor 48 or by any other sensing mechanism, e.g., a mechanical sensing mechanism, and it is translated into operational commands for the operation of device 10 via the control panel of player 100.

Another sensing mechanism 50 is preferably employed for sensing an operation of a magnetic recording head 104 (record) or magnetic playing head 101 (stop) of cassette player 100. This sensing mechanism preferably includes a magnetic sensor which senses a proximity of heads 101 or 104 to an emulation surface 52 of emulator 22. Emulator 22 of device 10 according to the present invention operatively communicates with magnetic recording head 104 of cassette player 100 for recording in a digital form audio information through magnetic recording head 104 as received, for example, via a microphone 106 connected to or integrally formed with prayer 100 or via a radio device which is a counterpart of player 100 in a stereo system.

According to a preferred embodiment of the present invention portable audio device 10 includes a power source, such as a battery 54, e.g., a rechargeable battery, engageable in housing 12. For a rechargeable battery 54, housing 12 is preferably formed with a charging connector 56 which serves for charging rechargeable battery 54.

According to a preferred embodiment of the present invention portable audio device 10 further includes a visual display 58. Display 58 which can be, for example, a light emitting diode display or a liquid crystal display, serves for displaying visual information, such as, but not limited to, information pertaining to a played audio information, such as name of performer and song, power availability and memory availability.

According to another preferred embodiment portable audio device 10 of the present invention further includes a radiotransistor 60 for receiving and playing via speaker(s) 20 radio broadcast. The radio broadcast can also be recorded and stored in memories 16 and/or 40 via recording chip 26. In this case additional button or buttons 32 are provided for selecting radio frequency, etc.

The present invention provides a significant improvement over known designs because the portable audio device of the present invention is operable as a stand-alone digital audio device, as well as a digital cassette operable with a convention, i.e., analog, cassette player.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A portable audio device comprising:
   (a) a housing shaped as a cassette and insertable into a cassette deck of a cassette player;
   (b) a digital audio player in said housing, said digital audio player including a memory and an audio chip for storing and subsequently playing digital audio information through at least one speaker; and
   (c) an emulator in said housing, said emulator operatively communicating with said digital audio player for emulating said digital audio information as analog audio information readable by a magnetic playing head of said cassette player for playing said digital audio information through said cassette player.

2. The portable audio device of claim 1, wherein said at least one speaker is integrally built in said housing.

3. The portable audio device of claim 1, wherein said at least one speaker is externally connectable to the portable audio device through a speaker connector formed in said housing and which is operatively communicating with said digital audio player.

4. The portable audio device of claim 1, wherein said at least one speaker is formed and operated as at least one earset.

5. The portable audio device of claim 1, wherein said at least one speaker includes two speakers.

6. The portable audio device of claim 5, wherein said two speakers are externally connectable to the portable audio device through a speaker connector formed in said housing and which is operatively communicating with said digital audio player.

7. The portable audio device of claim 5, wherein said two speakers are formed and operated as earsets.

8. The portable audio device of claim 1, further comprising external operation buttons engaged by said housing for executing operator commands.

9. The portable audio device of claim 8, wherein said operator commands are selected from the group consisting of play, stop, pause, backward, forward, repeat, repeat a sequence, volume control, bass control, treble control, speakers balance and fade effects control.

10. The portable audio device of claim 1, further comprising a recording chip in said housing, said recording chip being for recording in a digital form sound into said memory.

11. The portable audio device of claim 10, wherein said audio chip and said recording chip are integrated into a single audio-recording chip.

12. The portable audio device of claim 10, further comprising a microphone in said housing, said microphone operatively communicating with said recording chip.

13. The portable audio device of claim 10, further comprising an external microphone connector formed in said housing so as to enable an external microphone to operatively communicate with said recording chip.

14. The portable audio device of claim 10, further comprising external operation buttons engaged by said housing for executing operator commands.

15. The portable audio device of claim 8, wherein said operator commands are selected from the group consisting of play, stop, pause, backward, forward, repeat, repeat a sequence, record, volume control, bass control, treble control, speakers balance and fade effects control.

16. The portable audio device of claim 1, further comprising a communicator for communicating with a computer, said communicator being for downloading digital audio information from said computer for storing in said memory.

17. The portable audio device of claim 16, wherein said communicator is selected from the group consisting of cord communicator and cordless communicator.

18. The portable audio device of claim 17, wherein said cordless communicator is selected from the group consisting of infrared communicator, radio communicator and microwave communicator.

19. The portable audio device of claim 1, further comprising:
 (d) at least one sensor for sensing at least some operational commands of said cassette player when the portable audio device engages said cassette deck of said cassette player; and
 (e) at least one mechanism for translating said operational commands of said cassette player into respective executed operations of the portable audio device.

20. The portable audio device of claim 19, wherein said at least one sensor includes at least one reel for sensing an operational command selected from the group consisting of play, pause, backward and forward.

21. The portable audio device of claim 19, wherein said at least one sensor includes a sensing mechanism for sensing an operation of a magnetic recording head of said cassette player.

22. The portable audio device of claim 1, further comprising a power source engageable in said housing.

23. The portable audio device of claim 1, wherein said power source is a battery.

24. The portable audio device of claim 1, wherein said power source is a rechargeable battery, said housing is formed with a charging connector for recharging said rechargeable battery.

25. The portable audio device of claim 1, further comprising a visual display for displaying visual information.

26. The portable audio device of claim 25, wherein said visual information is selected from the group consisting of information pertaining to a played audio information, power availability and memory availability.

27. The portable audio device of claim 25, wherein said visual display is selected from the group consisting of a light emitting diode display and a liquid crystal display.

28. The portable audio device of claim 1, further comprising a slot for operatively accepting a memory expansion device.

29. The portable audio device of claim 1, wherein said emulator operatively communicating with a magnetic recording head of said cassette player for recording in a digital form audio information through said magnetic recording head.

30. The portable audio device of claim 1, further comprising a radiotransistor for receiving and playing radio broadcast.

* * * * *